US012366542B2

(12) United States Patent
Nagano et al.

(10) Patent No.: US 12,366,542 B2
(45) Date of Patent: Jul. 22, 2025

(54) NONDESTRUCTIVE INSPECTION SYSTEM (71) Applicants: TOPCON CORPORATION, Tokyo (JP); RIKEN, Wako (JP)

(72) Inventors: Shigenori Nagano, Tokyo (JP); Satoshi Yanobe, Tokyo (JP); Akira Yajima, Tokyo (JP); Hanako Aikoh, Tokyo (JP); Satoru Ishiguro, Tokyo (JP); Yoshie Otake, Wako (JP); Yasuo Wakabayashi, Wako (JP); Masato Takamura, Wako (JP)

(73) Assignees: TOPCON CORPORATION, Tokyo (JP); RIKEN, Wako-shi (JP)

( * ) Notice: Subject to any disclaimer, the term of this patent is extended or adjusted under 35 U.S.C. 154(b) by 127 days.

(21) Appl. No.: 18/553,264

(22) PCT Filed: Mar. 31, 2022

(86) PCT No.: PCT/JP2022/016726
§ 371 (c)(1),
(2) Date: Sep. 29, 2023

(87) PCT Pub. No.: WO2022/211063
PCT Pub. Date: Oct. 6, 2022

(65) Prior Publication Data
US 2024/0192153 A1 Jun. 13, 2024

(30) Foreign Application Priority Data
Mar. 31, 2021 (JP) ................................ 2021-062001

(51) Int. Cl.
*G01N 23/222* (2006.01)
*G01N 23/204* (2006.01)
(Continued)

(52) U.S. Cl.
CPC ......... *G01N 23/222* (2013.01); *G01N 23/204* (2013.01); *G01N 23/22* (2013.01); *G01N 23/2206* (2013.01); *G01N 2223/0745* (2013.01)

(58) Field of Classification Search
CPC .. G01N 23/204; G01N 23/22; G01N 23/2206; G01N 23/222; G01N 2223/0745
See application file for complete search history.

(56) References Cited

U.S. PATENT DOCUMENTS

| 4,361,534 A | 11/1982 | Borsaru et al. |
| 8,680,477 B2 | 3/2014 | Nose et al. |

(Continued)

FOREIGN PATENT DOCUMENTS

| GB | 2493641 A | * 2/2013 | ............. G01V 11/00 |
| JP | 2009-175065 A | 8/2009 | |

(Continued)

OTHER PUBLICATIONS

Wakabayashi et al., Nondestructive measurement technique for salt distribution in concrete by neutron-captured prompt gamma-ray analysis, NPGA, Inspection Engineering, Feb. 2019, pp. 1811-1817.

(Continued)

*Primary Examiner* — Mark R Gaworecki
(74) *Attorney, Agent, or Firm* — Chiesa Shahinian & Giantomasi PC (57) ABSTRACT A non-destructive inspection system includes: a neutron emission unit capable of emitting neutrons having a first neutron dose; a neutron detection unit capable of detecting a second neutron dose of neutrons scattered inside an inspection object A by the emission of the neutrons from the neutron emission unit; a gamma-ray detection unit capable of detecting a gamma dose of gamma rays released from the inspection object A by the emission of the neutrons from the (Continued)

neutron emission unit; and an analysis unit configured to calculate a content of a predetermined substance based on the gamma dose and correct the content of the predetermined substance based on the first neutron dose and the second neutron dose.

6 Claims, 9 Drawing Sheets

(51) Int. Cl.
  *G01N 23/22* (2018.01)
  *G01N 23/2206* (2018.01)

(56) References Cited

U.S. PATENT DOCUMENTS

| | | | |
|---|---|---|---|
| 11,614,415 | B2 | 3/2023 | Nagano et al. |
| 2012/0199754 | A1 | 8/2012 | Nose et al. |
| 2022/0082514 | A1 | 3/2022 | Nagano et al. |

FOREIGN PATENT DOCUMENTS

| | | |
|---|---|---|
| JP | 2011-085481 A | 4/2011 |
| JP | 2020-139806 A | 9/2020 |

OTHER PUBLICATIONS

Otake, Yoshie, Towards preventive Maintenance with Non-Destructive Test Using Compact Neutron Systems. Journal of the japan Society of Colour Material, Mar. 2021, vol. 94, No. 3, pp. 80-84.

International Search Report and Written Opinion mailed May 31, 2022, in connection with International Patent Application No. PCT/JP2022/016726, 9 pgs. (including translation).

* cited by examiner

NONDESTRUCTIVE INSPECTION SYSTEM

This application is National Stage under 35 U.S.C. 371 of International Patent Application No. PCT/JP2022/016726, filed Mar. 31, 2022, which claims priority to Japanese Patent Application No. 2021-062001, filed Mar. 31, 2021; the disclosures of all of which are incorporated herein by reference in their entirety.

TECHNICAL FIELD

The present disclosure relates to a non-destructive inspection system for an inspection object using radioactive rays.

BACKGROUND ART

In recent years, there has been a desire to appropriately maintain, repair, or renew aging infrastructure (hereinafter, referred to as infrastructure constructions) such as roads, bridges, tunnels, and building structures.

To inspect such an infrastructure construction, non-destructive inspection is performed using radiation, such as X-rays, penetrating an object. This non-destructive inspection allows an internal structure of an inspection object to be analyzed without destroying the inspection object.

In particular, in recent years, non-destructive inspection apparatuses using neutron beams with higher penetrating power than X-rays have also been studied. For example, Patent Document 1 and Non-Patent Document 1 each disclose a non-destructive inspection method that enables acquisition of a salt concentration distribution inside concrete by utilizing neutron beams and gamma (γ)-rays generated in reaction with the neutron beams.

CITATION LIST

Patent Documents

PATENT DOCUMENT 1: Japanese Unexamined Patent Publication No. 2011-85481.

Non-Patent Document

Non-Patent Document 1: Yasuo Wakabayashi, Yuichi Yoshimura, Maki Mizuta, Yujiro Ikeda, Yoshie Otake/ Riken, Non-Destructive Measurement Technique for Salt Distribution in Concrete by Neutron-Captured Prompt Gamma-Ray Analysis, Inspection Engineering February 2019, JAPAN INDUSTRIAL PUBLISHING (NPGA)

SUMMARY OF THE INVENTION

Technical Problems

Here, Non-Patent Document 1 teaches calculating the salt concentration from the count rate of detected gamma rays (the number of gamma rays detected per unit time) using a concentration-dependent calibration curve (the count rate of gamma rays with respect to the concentration) where the calibration curve is obtained in advance by emitting neutrons to a mortar specimen containing salt at an adjusted concentration. The salt concentration is proportional to the count rate of gamma rays having a certain energy, and the salt concentration increases as the count rate increases. This relationship is established on the assumption that the inside of the mortar specimen is uniform containing neither water nor cavities and the number of penetrating neutrons of the mortar specimen in the depth direction decreases along a predetermined attenuation curve. On the other hand, if concrete as an actual inspection object contains water or cavities at a measurement point or in the route of neutrons to the measurement point, the attenuation of neutrons in the route does not coincide with the predetermined attenuation curve due to scattering or radiation. In this case, since the number (dose) of neutrons reaching the depth of the measurement point varies, the count rate (the gamma dose) of prompt gamma rays also varies and an accurate salt concentration is unavailable from the calibration curve.

The present disclosure was made to solve such problems. It is an objective to provide a non-destructive inspection apparatus for non-destructive inspection using neutrons to inspect an inspection object, where the gamma dose from a measurement point in the inspection object is corrected in consideration of change in the attenuation of neutrons reaching the measurement point in order to enable more accurate estimation of the salt concentration in the inspection object.

Solution to the Problems

In order to achieve the above objective, a non-destructive inspection system of the present disclosure includes: a neutron emission unit capable of emitting neutrons having a first neutron dose; a neutron detection unit capable of detecting a second neutron dose of neutrons scattered inside an inspection object by the emission of the neutrons from the neutron emission unit; a gamma-ray detection unit capable of detecting a gamma dose of gamma rays released from the inspection object by the emission of the neutrons from the neutron emission unit; and an analysis unit configured to calculate a content of a predetermined substance based on the gamma dose and correct the content of the predetermined substance based on the first neutron dose and the second neutron dose.

In the non-destructive inspection system, the content of the predetermined substance may be a salt concentration.

In the non-destructive inspection system, the analysis unit may generate a distribution of water and/or cavities contained in the inspection object based on the second neutron dose.

In the non-destructive inspection system, the neutron emission unit may include an accelerator. The non-destructive inspection system may further include an emission control unit configured to cause the accelerator to emit neutrons having the first neutron dose.

In the non-destructive inspection system, the neutron emission unit may include a radioisotope. The non-destructive inspection system may further include a dose monitor capable of detecting the first neutron dose.

In the non-destructive inspection system, the neutron emission unit may be mounted on a moving object.

Advantages of the Invention

According to the present disclosure containing the above means, non-destructive inspection using neutrons to inspect an inspection object is performed, where the gamma dose from a measurement point in the inspection object is corrected based on the dose of neutrons reaching the measurement point in order to enable more accurate estimation of the salt concentration in the inspection object.

DETAILED DESCRIPTION

Embodiments of the present disclosure will be described in detail below with reference to the drawings.

First Embodiment

A first embodiment of the present disclosure will be described below.

Figure 1:
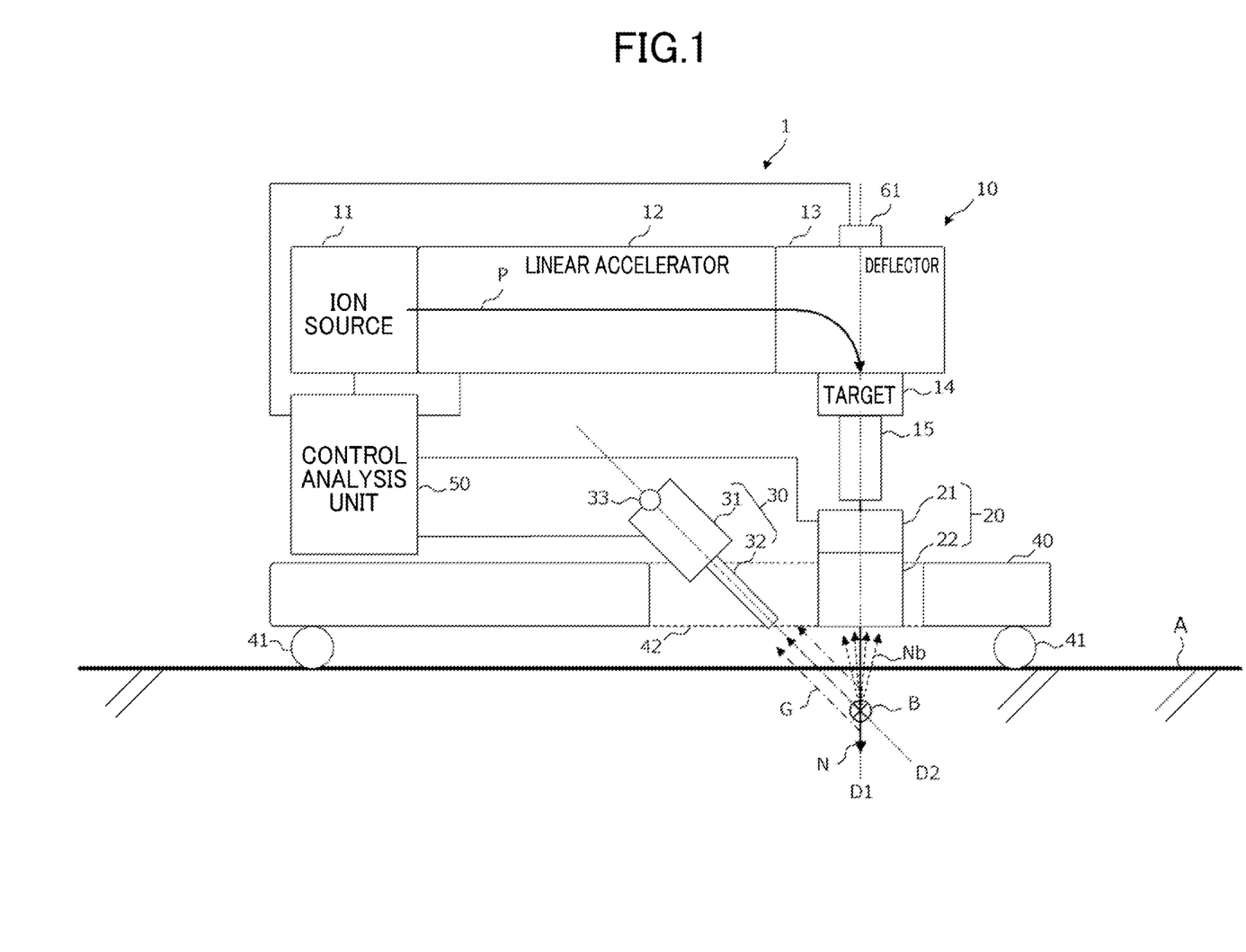
FIG. 1 is a schematic configuration diagram illustrating a non-destructive inspection system of a first embodiment of the present disclosure.

FIG. 1 is a schematic configuration diagram of a non-destructive inspection system of the first embodiment of the present disclosure. A configuration of a non-destructive inspection apparatus (non-destructive inspection system) 1 of this embodiment will now be described with reference to this figure.

As shown in FIG. 1, the non-destructive inspection apparatus 1 of this embodiment includes a moving object 40 provided with a neutron emission unit 10, a thermal neutron detection unit 20, a gamma-ray detection unit 30, and a GNSS 61. The non-destructive inspection apparatus 1 includes a control analysis unit 50 connected to the neutron emission unit 10, the thermal neutron detection unit 20, the gamma-ray detection unit 30, and the GNSS 61. In this embodiment, the non-destructive inspection apparatus 1 is placed on a bridge A as an inspection object made of concrete. Then, the moving object 40 moves on the bridge A to conduct non-destructive inspection aimed to measure a salt concentration and a water and cavity distribution at an inspection point B as an inspection object positioned below the moving object 40.

In this embodiment, the neutron emission unit 10 includes a power supply (not shown), an ion source 11, a linear accelerator 12, a deflector 13, a target 14, and an emission collimator 15.

The ion source 11 generates hydrogen ions (protons). The linear accelerator 12 accelerates the protons generated by the ion source 11 to generate a proton beam P, and then emits the proton beam P to the deflector 13. The deflector 13 includes a plurality of magnets which are electromagnets, for example. The deflector 13 deflects and emits, with magnetic force, the proton beam P emitted from the linear accelerator 12 substantially perpendicularly to the direction of incidence of the proton beam P.

The target 14 is provided on the emission side of the deflector 13 where the proton beam P is emitted. The target 14 generates neutrons N by colliding with the protons of the proton beam P incident from the deflector 13, and contains beryllium, for example. An emission opening (not shown) is formed on a side of the target 14 opposite to the deflector 13, and emits to the outside the neutrons N directed in a predetermined direction among the neutrons N generated from the target 14. The emission opening is provided with the emission collimator 15 that limits the emission line of the neutrons N. The neutrons N generated by the target 14 pass through the inside of the emission collimator 15 and are substantially perpendicularly incident on the bridge A as a neutron beam traveling in parallel to the axis of an emission line D1 shown in FIG. 1. The path from the linear accelerator 12 to the target 14 has a structure capable of maintaining high vacuum not to prevent the charged particles from flying.

The thermal neutron detection unit 20 includes a thermal neutron detector 21 capable of detecting thermal neutrons Nb and a thermal neutron collimator 22 for enhancing the directivity of the thermal neutrons Nb incident on the thermal neutron detector 21. The thermal neutron detector 21 of this embodiment detects the thermal neutrons Nb which are the neutrons N emitted from the target 14 and scattered backward from the vicinity of the inspection point B inside the bridge A as an inspection object. In FIG. 1, the neutrons N emitted from the target 14 are indicated by a solid arrow, and the thermal neutrons Nb are indicated by broken arrows.

The gamma-ray detection unit 30 includes a gamma-ray detector 31 capable of detecting gamma ($\gamma$-) rays, a gamma-ray collimator 32, and a movable shaft 33.

The gamma-ray detector 31 is a germanium semiconductor detector (a Ge detector), for example. An end of the gamma-ray detector 31 is connected with the gamma-ray collimator 32, and the gamma-ray detector 31 can detect the gamma rays that are incident on the gamma-ray detector 31 via the gamma-ray collimator 32. The gamma-ray detector 31 of this embodiment detects gamma rays G, what are called prompt gamma rays, that are released from the inside of concrete as an inspection object when the neutrons N emitted from the target 14 toward the inspection point B cause a neutron capture reaction with various atomic nuclei in the tissues near the inspection point B.

The gamma-ray collimator 32 is a cylindrical body made of a material, such as lead or iron, which blocks gamma rays and functions to narrow the gamma rays incident from the outside into the gamma rays G in one direction toward the gamma-ray detector 31. That is, in this embodiment, the axis of the gamma-ray collimator 32 extends along a detection line D2 of the gamma rays G. As shown in FIG. 1, the detection line D2 intersects the emission line D1 at one point. This intersection serves as the inspection point B inside the bridge A as an inspection object. With a higher salt concentration at the inspection point B, a higher dose of the gamma rays G than usual is detected by the gamma-ray detector 31. In FIG. 1, the gamma rays G emitted from the vicinity of the inspection point B in the bridge A are indicated by dot-dashed arrows.

The movable shaft 33 extends horizontally at the rear end of the gamma-ray detector 31. The gamma-ray detector 31 can swing vertically about the movable shaft 33, together with the gamma-ray collimator 32. This swing of the gamma-ray detector 31 about the movable shaft 33 enables the inspection point B to move on the emission line D1.

The moving object 40 is, for example, a vehicle or a trolley in a size suitable for mounting the neutron emission unit 10, the thermal neutron detection unit 20, the gamma-ray detection unit 30, and the GNSS 61. The moving object 40 with wheels 41 is substantially horizontally freely movable. The moving object 40 includes a bottom surface facing the bridge A and provided with an opening 42. This enables the thermal neutron detection unit 20 and the gamma-ray detection unit 30 to be partially placed in the opening 42, and thus the inspection point B below the opening 42 can be inspected.

The GNSS 61 is a global positioning system (GPS), for example, and is provided on the axis of the emission line D1 of the neutrons N, that is, provided vertically above the inspection point B in this embodiment. The GNSS 61 can receive information from satellites and generate its own position coordinates and the relative position information about the inspection point B.

The control analysis unit 50 is a dedicated computer, a general-purpose computer with software installed, or the like, and includes, for example, a calculation unit for calculation processing and a storage unit. The control analysis unit 50 further includes, for example, a display unit capable of displaying the results of calculation, an input unit for receiving operations and the like from the outside, and a communication unit capable of exchanging information with the outside.

Figure 2:
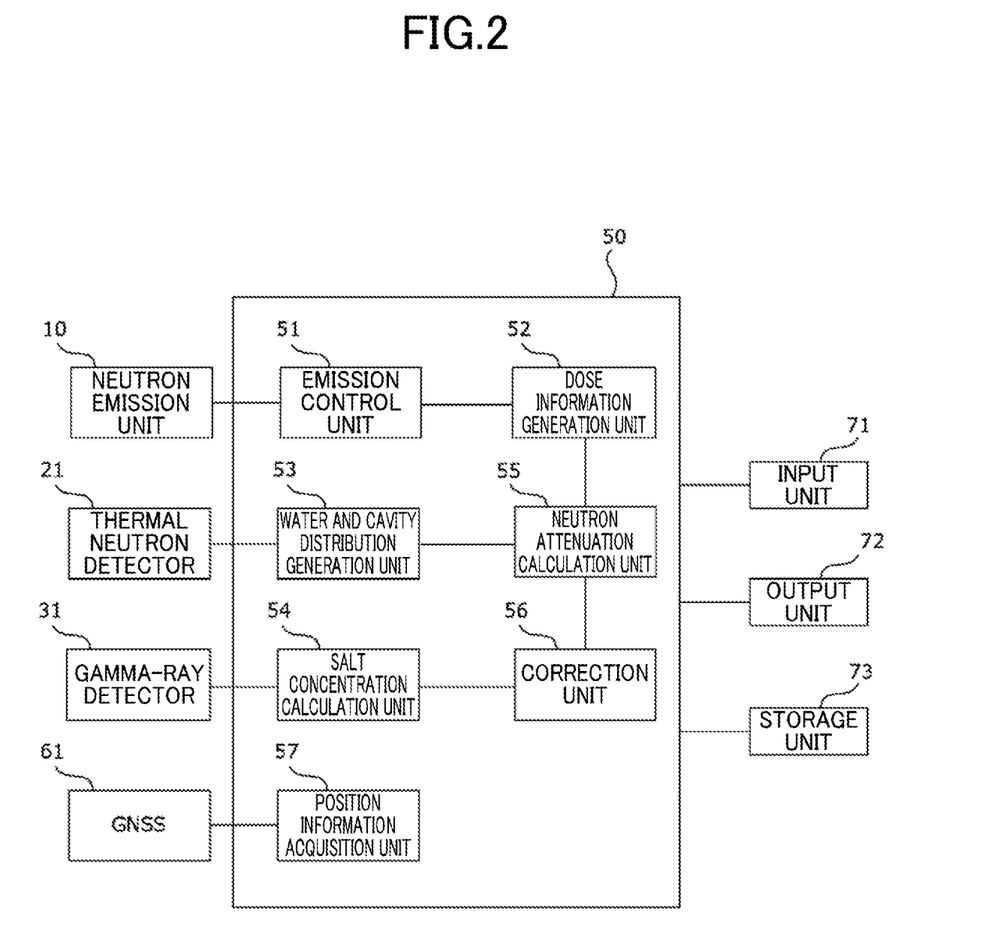
FIG. 2 is a block diagram of a configuration for control analysis in the non-destructive inspection system of the first embodiment of the present disclosure.

FIG. 2 is a block diagram of a configuration of the non-destructive inspection apparatus 1 performing control analysis of the first embodiment of the present disclosure. The control analysis unit 50 is communicatively connected in a wired or wireless manner to the neutron emission unit 10, the thermal neutron detector 21, the gamma-ray detector 31, the GNSS 61, an input unit 71, an output unit 72, and a storage unit 73. The input unit 71, the output unit 72, and the storage unit 73 may be mounted inside the control analysis unit 50. The control analysis unit 50 includes: an emission control unit 51 for controlling the neutron emission unit 10; a dose information generation unit 52, a water and cavity distribution generation unit 53, a salt concentration calculation unit 54, a neutron attenuation calculation unit 55, and a correction unit 56 serving as analysis units for analysis; and a position information acquisition unit 57 that acquires the position of the inspection point B.

The control analysis unit 50 acquires: the dose of thermal neutrons (the second neutron dose) which is a count rate of the thermal neutrons Nb detected by the thermal neutron detector 21; the dose of gamma which is a count rate of the gamma rays G detected by the gamma-ray detector 31; and the position information on the inspection point B generated by the GNSS 61. Then, the information on the dose of thermal neutrons acquired above and the information on the dose of gamma acquired above are associated with the position information on the inspection point B and stored in the storage unit 73 as thermal neutron dose information and gamma dose information, respectively. The control analysis unit 50 also calculates the salt concentration which is the content of chlorine at the inspection point B, based on the acquired gamma dose. The control analysis unit 50 generates a water and cavity distribution based on the acquired dose of thermal neutrons. The distribution can be output to the output unit 72 and the storage unit 73, for example, as a result of analysis.

The emission control unit 51 controls the linear accelerator 12. For example, the linear accelerator 12 can be controlled so that the neutron emission unit 10 emits a temporally discrete pulsed neutron beam having a first neutron dose.

The dose information generation unit 52 generates the dose information indicating the dose (the first neutron dose) of the neutrons N emitted from the target 14 via the emission collimator 15 toward the inspection point B, based on the control information acquired from the emission control unit 51. The dose information is then stored in the storage unit 73.

The water and cavity distribution generation unit 53 generates the water and cavity distribution information in the depth direction at the inspection point B, based on the thermal neutron dose information and the position information on the inspection point B. The water and cavity distribution information is then stored in the storage unit 73.

The salt concentration calculation unit 54 calculates the content of chlorine, that is, the salt concentration at the inspection point B based on the gamma dose information, and generates the salt concentration information. The calculated salt concentration information is then stored in the storage unit 73. Note that a typically known method may be employed to analyze the salt concentration in a specific inspection object. For example, collimation or gamma-ray intensity comparison described in Non-Patent Document 1 is employed.

The neutron attenuation calculation unit 55 calculates the neutron attenuation at the inspection point B in the depth direction, based on the water and cavity distribution information and the dose information at the inspection point B, and generates the neutron attenuation information. The neutron attenuation information is then stored in the storage unit 73.

The correction unit 56 corrects the salt concentration information based on the neutron attenuation information and the dose information at the inspection point B, and generates the corrected salt concentration information. The corrected salt concentration information is then stored in the storage unit 73. Specifically, the dose of the neutrons N reaching the inspection point B is calculated from the dose information and the neutron attenuation information such that a difference from a predetermined attenuation curve is acquired. Then, the salt concentration is corrected. For example, if there is water on the way of the neutrons N to the inspection point B, the dose of scattered thermal neutrons increases, the neutron attenuation increases, and the gamma dose increases. Thus, the correction is performed to reduce the salt concentration based on the gamma dose information. The same applies to the case where there are cavities.

The position information acquisition unit 57 acquires the position information on the inspection point B from the GNSS 61 where the neutron emission unit 10 emits the neutrons N to the inspection point B. The position information is then stored in the storage unit 73.

Figure 3:
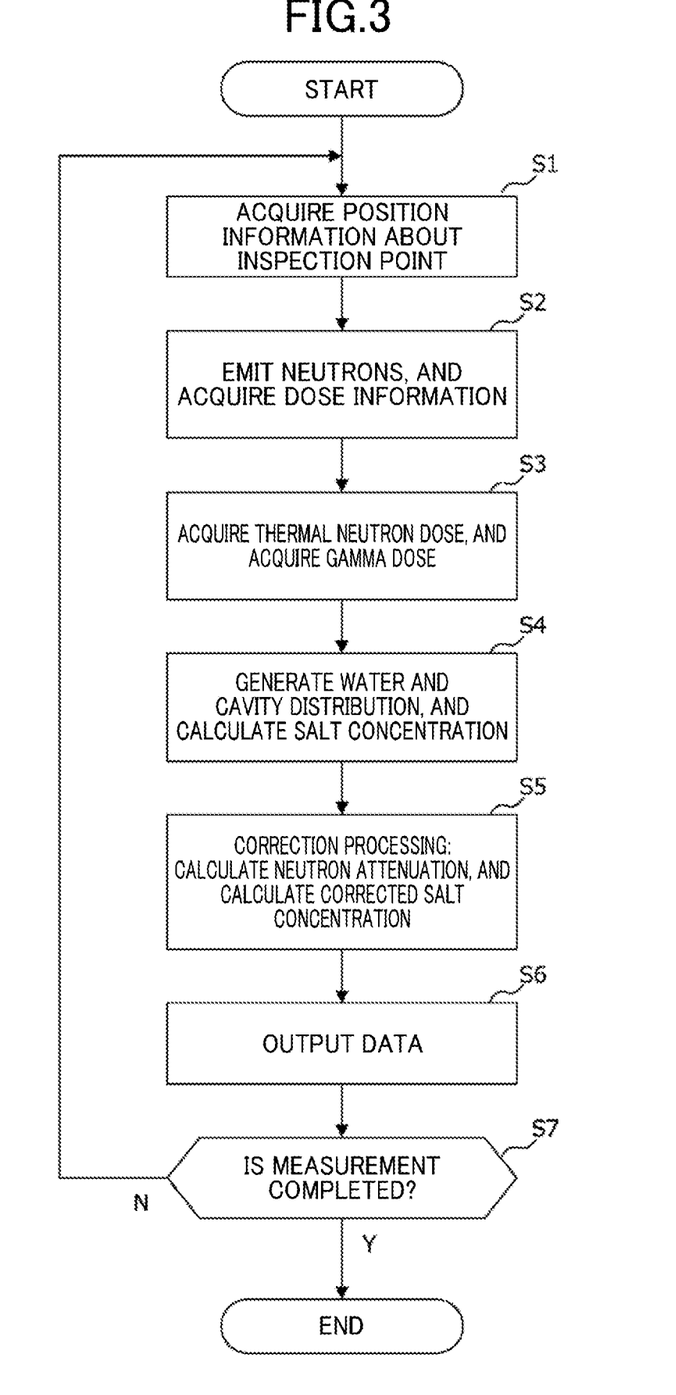
FIG. 3 is a flowchart illustrating a control analysis operation of the non-destructive inspection system of the first embodiment of the present disclosure.

Next, the operation of the non-destructive inspection apparatus 1 of the first embodiment will be described with reference to the flowchart shown in FIG. 3.

In step S1, the position information acquisition unit 57 of the control analysis unit 50 acquires the position information on the inspection point B from the GNSS 61.

In step S2, the emission control unit 51 of the control analysis unit 50 controls the neutron emission unit 10 to pulse-emit the neutrons N having the first neutron dose. At this time, the dose information generation unit 52 of the control analysis unit 50 acquires the first neutron dose as the dose information from the emission control unit 51. The first neutron dose is then stored in the storage unit 73.

In step S3, the control analysis unit 50 acquires a thermal neutron dose (a second neutron dose) from the thermal neutron detector 21. The thermal neutron dose is then stored as thermal neutron dose information in the storage unit 73. The control analysis unit 50 also acquires the gamma dose from the gamma-ray detector 31. The gamma dose is then stored as gamma dose information in the storage unit 73.

In step S4, the water and cavity distribution generation unit 53 of the control analysis unit 50 generates the water and cavity distribution based on the thermal neutron dose information. The water and cavity distribution is then stored as water and cavity distribution information in the storage unit 73. The salt concentration calculation unit 54 of the control analysis unit 50 also calculates the salt concentration based on the gamma dose information. The salt concentration is then stored as salt concentration information in the storage unit 73.

In step S5, the neutron attenuation calculation unit 55 of the control analysis unit 50 calculates the neutron attenuation based on the dose information and the water and cavity distribution information. The neutron attenuation is then stored as neutron attenuation information in the storage unit 73. Further, the correction unit 56 of the control analysis unit 50 performs the correction processing of the salt concentration information based on the calculated neutron attenuation information. The corrected salt concentration information is then stored in the storage unit 73.

In step S6, the output unit 72 displays, in a visible manner to the user, the corrected salt concentration information acquired in the correction processing in step S5. The position information, the dose information, the thermal neutron dose information, the gamma dose information, the water and cavity distribution information, the salt concentration information, and the neutron attenuation information stored in the storage unit 73 can be displayed upon request by the user.

In step S7, the control analysis unit 50 determines whether to end the measurement upon request by the user. For example, if the measurement is completed within a predetermined measurement time and/or range, the determination is regarded as determination (Y) to end the process. If the measurement is not completed, the determination is regarded as determination (N) to return the process to step S1.

As described above, the non-destructive inspection apparatus 1 of this embodiment emits the neutrons N having the first neutron dose (the dose of neutrons) to the inspection point B in the bridge A as an inspection object from the neutron emission unit 10, and calculates the salt concentration at the inspection point B based on the gamma dose detected by the gamma ray detector 31. The non-destructive inspection apparatus 1 also emits the neutrons N having the first neutron dose to the inspection point B in the bridge A as an inspection object from the neutron emission unit 10, and generates the water and cavity distribution in the depth direction at the inspection point B based on the thermal neutron dose (the second neutron dose) of the thermal neutrons Nb detected by the thermal neutron detector 21. That is, the salt concentration at the inspection point B can be measured and the water and cavity distribution in the depth direction can be generated by one apparatus and by one emission of a neutron beam. The nondestructive inspection apparatus 1 calculates the neutron attenuation in the depth direction at the inspection point B from the water and cavity distribution and the dose of neutrons (the first neutron dose) where the water and cavity distribution is obtained from the thermal neutron dose (the second neutron dose); and performs the correction processing of the salt concentration based on the neutron attenuation. That is, the salt concentration is corrected which is calculated based on the gamma dose from the inspection point B in consideration of a change in the attenuation of the neutron dose reaching the inspection point B in the bridge A, and thus the salt concentration at the inspection point B in the bridge A as an inspection object can be estimated more accurately. That is, the salt concentration can be calculated more accurately in consideration of a variation in the attenuation caused due to the water and cavities at and around the inspection point B.

The components of the non-destructive inspection apparatus 1 of this embodiment is mounted on the moving object 40, and thus can perform measurement while moving.

Second Embodiment

A second embodiment of the present disclosure will be described below.

Figure 4:
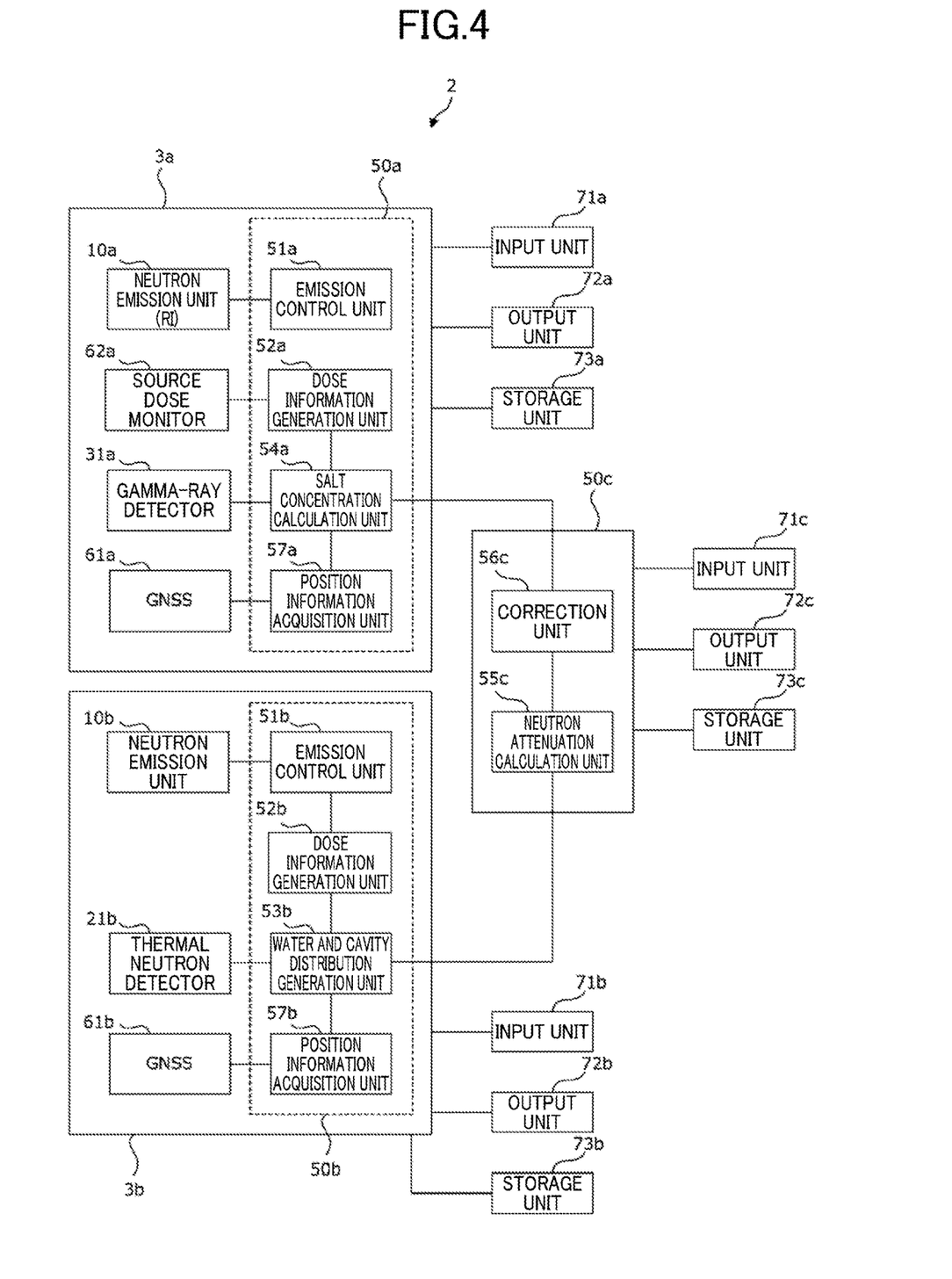
FIG. 4 is a block diagram schematically showing a non-destructive inspection system of a second embodiment of the present disclosure.
Figure 5:
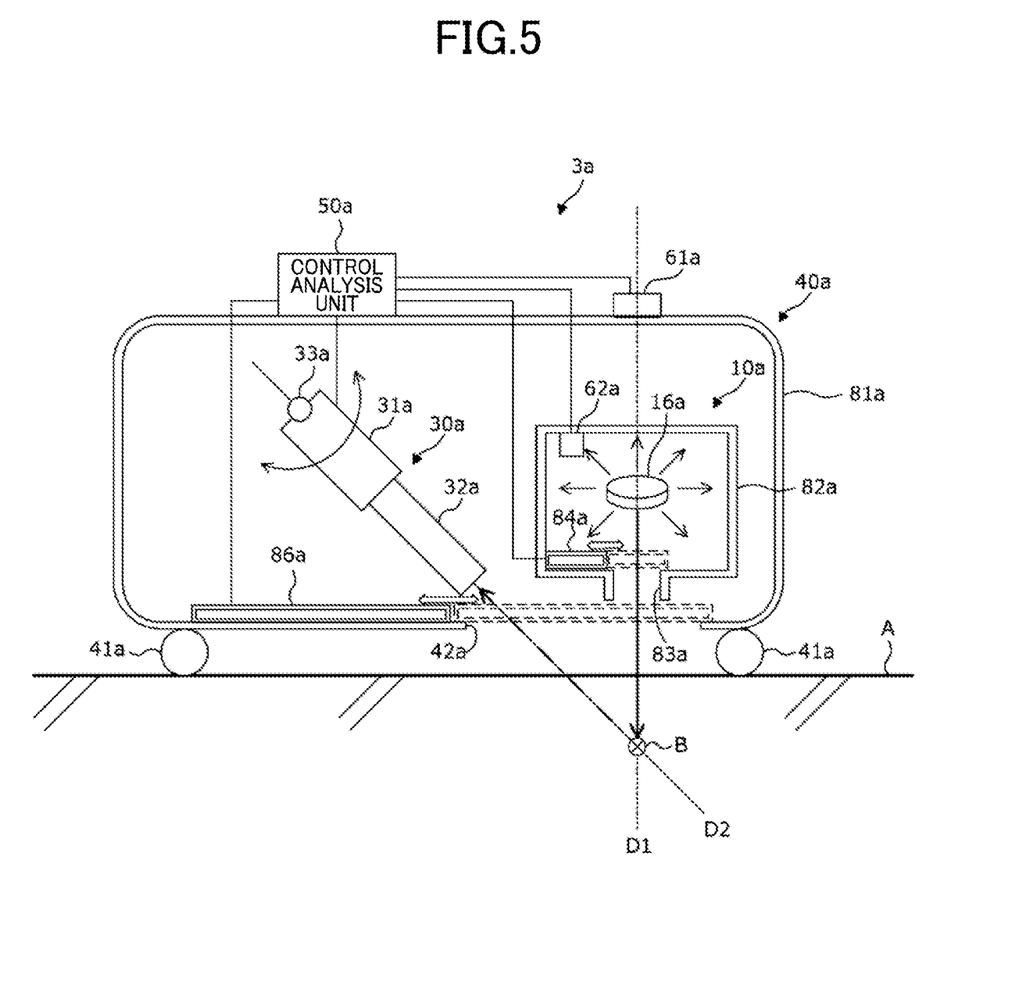
FIG. 5 is a schematic configuration diagram illustrating a salt measurement device of the second embodiment of the present disclosure.
Figure 6:
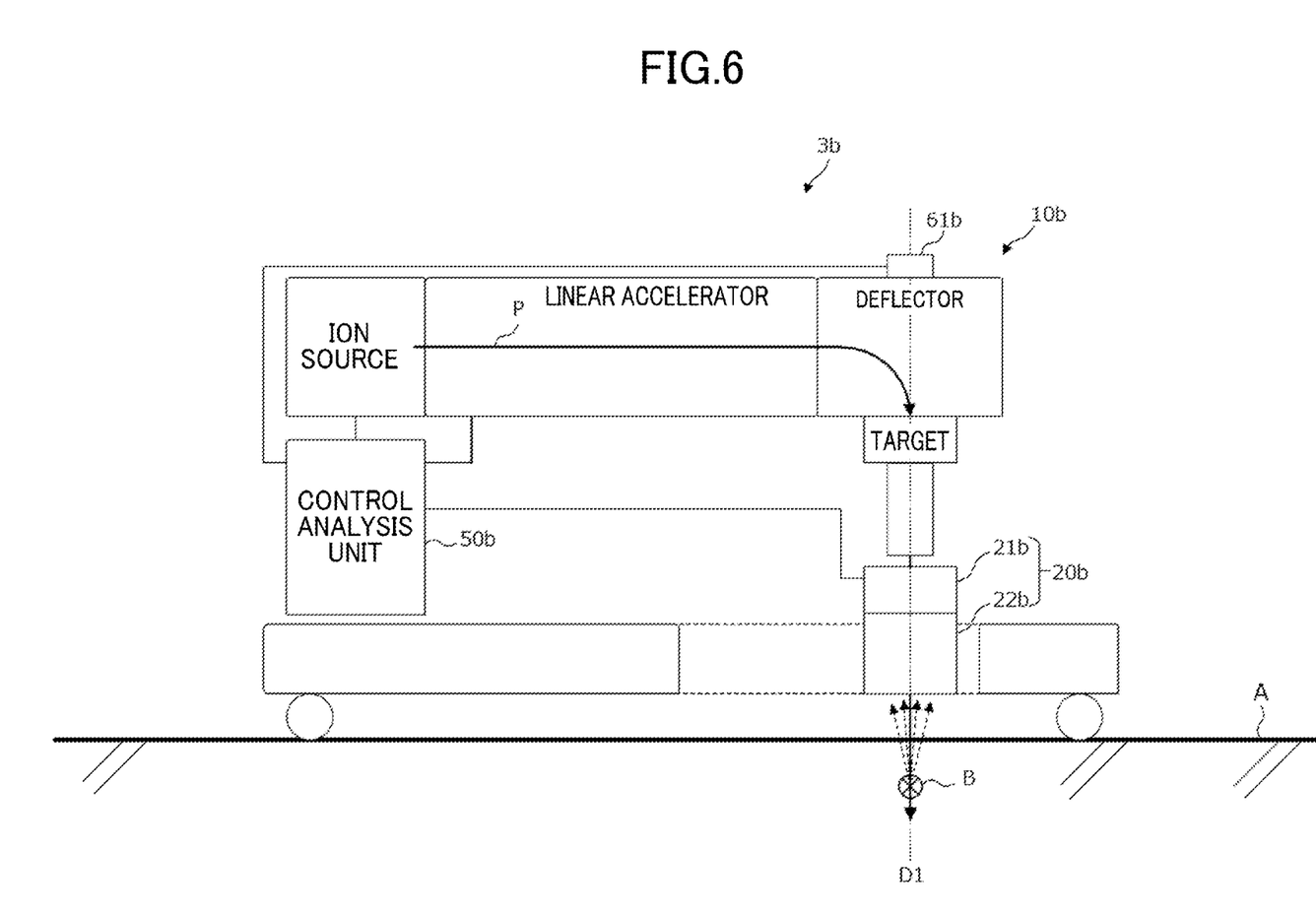
FIG. 6 is a schematic configuration diagram illustrating an example of a water and cavity measurement device of the second embodiment of the present disclosure.

FIG. 4 is a block diagram showing a non-destructive inspection system of the second embodiment of the present disclosure. FIG. 5 is a schematic configuration diagram illustrating a salt measurement device of the second embodiment of the present disclosure. FIG. 6 is a schematic configuration diagram illustrating an example of a water and cavity measurement device of the second embodiment of the present disclosure. The configuration of a nondestructive inspection system 2 of the second embodiment will now be described with reference to these figures. The same reference characters are used to represent the same components as those in the first embodiment, and a description thereof is omitted.

In the first embodiment, both the thermal neutron detection unit 20 for generating the water and cavity distribution at the inspection point B and the gamma-ray detection unit 30 for measuring the salt concentration are mounted on the single moving object 40. The second embodiment is different in that those units are mounted on different moving objects to function separately as a thermal neutron detection unit 20a and a gamma-ray detection unit 30b, which form a salt concentration measurement device 3a and a water and cavity measurement device 3b, respectively. Another difference is that a neutron attenuation calculation unit 55c and a correction unit 56c for the correction processing of the salt concentration are further provided separately.

As shown in FIG. 4, the non-destructive inspection system 2 includes the salt concentration measurement device 3a, the water and cavity measurement device 3b, and a correction processing unit 50c which are communicatively connected in a wired or wireless manner to each other. The salt concentration measurement device 3a, the water and cavity measurement device 3b, and the correction processing unit 50c are communicatively connected to input units 71a, 71b, and 71c, output units 72a, 72b, and 72c, and storage units 73a, 73b, and 73c.

The salt concentration measurement device 3a includes a neutron emission unit 10a, a gamma-ray detector 31a, a GNSS 61a, a source dose monitor 62a, and a control analysis unit 50a. The control analysis unit 50a is communicatively connected to the neutron emission unit 10a, the gamma-ray detectors 31a, the GNSS 61a, and the source dose monitor 62a. The control analysis unit 50a is a dedicated computer, a general-purpose computer with software installed, or the like, and includes: an emission control unit 51a for controlling the neutron emission unit 10a; a dose information generation unit 52a, a water and cavity distribution generation unit 53a, a salt concentration calculation unit 54a, a neutron attenuation calculation unit 55a, and a correction unit 56a serving as analysis units for analysis; and a position information acquisition unit 57a that acquires the position of the inspection point B.

Next, a specific configuration of the salt concentration measurement device 3a will be described with reference to FIG. 5. The salt concentration measurement device 3a includes the neutron emission unit 10a that uses a radioisotope 16a as a neutron source.

The salt concentration measurement device 3a includes the neutron emission unit 10a and a gamma-ray detection unit 30a in an apparatus case 81a. The salt concentration measurement device 3a includes the control analysis unit 50a, and the control analysis unit 50a is connected to the gamma-ray detection unit 30a and the source dose monitor 62a.

The neutron emission unit 10a includes the radioisotope 16a as a neutron source in a source case 82a. The radioisotope 16a is a $^{252}$Cf source, for example.

The source case 82a is in a hollow, substantially cubic shape, and includes, in the bottom surface thereof, an emission hole 83a for neutron beams in this embodiment. The source case 82a is also provided with a source shutter 84a that opens and closes the emission hole 83a. The source case 82a and the source shutter 84a are made of a material, such as lead or iron, capable of shielding neutron beams. The emission hole 83a is a circular hole, for example. The source shutter 84a is an opening and closing plate member that uses an actuator (not shown) to slide on the bottom surface of the source case 82a so as to open and close the emission hole 83a. The source dose monitor 62a is provided on the inner side of the top surface of the source case 82a, and the source dose monitor 62a detects the radioactive dose inside the source case 82a.

The source dose monitor 62a can detect radioactive rays including alpha (α-) rays, beta (β-) rays, and gamma (γ-) rays, for example. The source dose monitor 62a can also detect a spatial dose rate (microsievert per hour (μSv/h)) as a radioactive dose.

The neutron emission unit 10a with such a configuration can emit, to the outside, only the neutron beams directed in the emission line D1 on which the emission hole 83a is provided among the neutron beams radially emitted from the radioisotope 16a. The emission and stop (non-emission) of the neutron beams can be controlled by opening and closing the source shutter 84a.

The configuration of the gamma-ray detection unit 30a is the same as that of the gamma-ray detection unit 30 of the first embodiment, and thus the description thereof will be omitted.

The apparatus case 81a covers the neutron emission unit 10a and the gamma-ray detection unit 30a, and includes an opening 42a on the paths of the emission line D1 and the detection line D2. Specifically, the apparatus case 81a is in a hollow, substantially rectangular parallelepiped shape, and made of a material, such as lead or iron, capable of shielding neutron beams. The apparatus case 81a contains the neutron emission unit 10a on one horizontal side, and the gamma-ray detection unit 30a on the other horizontal side.

The apparatus case 81a includes, in the bottom surface thereof, the opening 42a on the paths of the emission line D1 and the detection line D2. Note that the opening range of the opening 42a is designed to include a range in which the detection line D2 varies according to the swing of the gamma-ray detection unit 30a about the movable shaft 33a.

The apparatus case 81a includes, on the bottom thereof, an outer shutter 86a that opens and closes the opening 42a. The outer shutter 86a is made of a material, such as lead or iron, capable of shielding neutron beams. The outer shutter 86a is a plate member that uses an actuator (not shown) to slide on the bottom surface of the apparatus case 81a so as to open and close the opening 42a.

The apparatus case 81a includes a GNSS 61a on the outer side of a top surface thereof. The GNSS 61a is provided on the axis of the emission line D1 of the neutrons N, that is, provided vertically above the inspection point B in this embodiment. The GNSS 61 can receive information from satellites and detect its own position coordinates and the position information on the inspection point B.

The apparatus case 81a includes wheels 41a on the outer side of the bottom surface thereof, and is freely movable above the point B of inspection.

The control analysis unit 50a is electrically connected to the source dose monitor 62a, the source shutter 84a, and the outer shutter 86a. The control analysis unit 50a can execute at least control related to inspection (hereinafter referred to as "inspection control") in the salt concentration measurement device 3.

In the inspection control, the control analysis unit 50a mainly controls the source shutter 84a, the outer shutter 86a, and the gamma-ray detection unit 30a. Specifically, the control analysis unit 50a opens the outer shutter 86a and the source shutter 84a at the time of inspection.

The control analysis unit 50a uses the gamma-ray detection unit 30a to detect the gamma rays G generated with respect to the neutrons N emitted from the neutron emission unit 10a to inspection point B, and calculates the salt concentration at the inspection point B from the detected gamma dose. The control analysis unit 50a also acquires, from the source dose monitor 62a, the dose of the neutrons N emitted to the inspection point B. The control analysis unit 50a further acquires the position information on the inspection point B from the GNSS 61a. The control analysis unit 50a generates the salt concentration information by associating the salt concentration calculated for the inspection point B with the position information and the dose. The salt concentration information is then stored in the storage unit 73a.

A specific configuration of the water and cavity measurement device 3b is as shown in FIG. 6. As is apparent from a comparison with FIG. 1, the water and cavity measurement device 3b has a configuration of the non-destructive inspection apparatus 1 of the first embodiment without the gamma-ray detection unit 30 and the accompanying analysis unit (i.e., the salt concentration calculation unit). The other functions are the same, and the detailed descriptions thereof will thus be omitted. The water and cavity measurement device 3b with such a configuration causes the storage unit 73c to store the water and cavity distribution in the depth direction at the inspection point B in association with the position information.

The correction processing unit (the analysis unit) 50c is a dedicated computer separated from the salt concentration measurement device 3a and the water and cavity measurement device 3b; a general-purpose computer with software installed; or the like, and is communicatively connected to the salt concentration measurement device 3a and the water and cavity measurement device 3b. The correction processing unit 50c acquires the salt concentration information from the salt concentration measurement device 3a, and the water and cavity distribution information from the water and cavity measurement device 3b. In addition, the correction processing unit 50c calculates the neutron attenuation in the depth direction at the inspection point B in the neutron attenuation calculation unit 55c, based on the water and cavity distribution information associated with the position information on the inspection point B. The correction processing unit 50c then performs the correction processing of the salt concentration information associated with the position information on the same inspection point B based on the neutron attenuation. The correction processing unit 50c may be mounted on the salt concentration measurement device 3a or the water and cavity measurement device 3b.

As described above, in the non-destructive inspection system 2 of the second embodiment, the salt concentration measurement device 3a, the water and cavity measurement device 3b, and the correction processing device are separated from each other. Accordingly, the existing large-sized water and cavity measurement device 3b is used together to acquire the water and cavity distribution information and correct the salt concentration, such that the accuracy in measuring the salt concentration can be improved. The radioisotope 16a is used as a neutron source for measurement of the salt concentration, while the accelerator is used as a neutron source for measurement of the water and cavity distribution. This allows downsizing of the salt concentration measurement device 3a.

Third Embodiment

Next, a third embodiment of the present disclosure will be described below.

Figure 7:
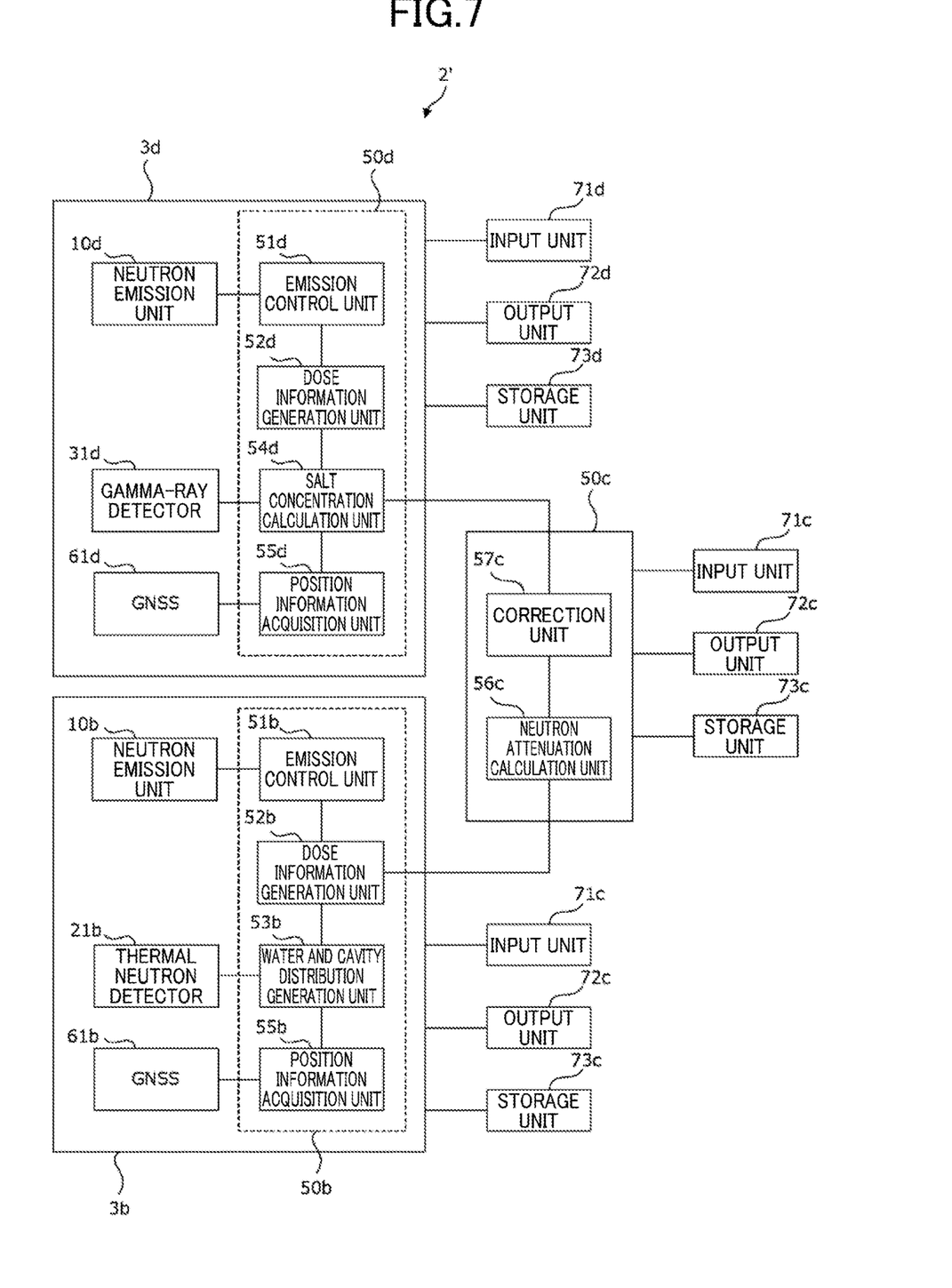
FIG. 7 is a block diagram schematically showing a non-destructive inspection system of a third embodiment of the present disclosure.
Figure 8:
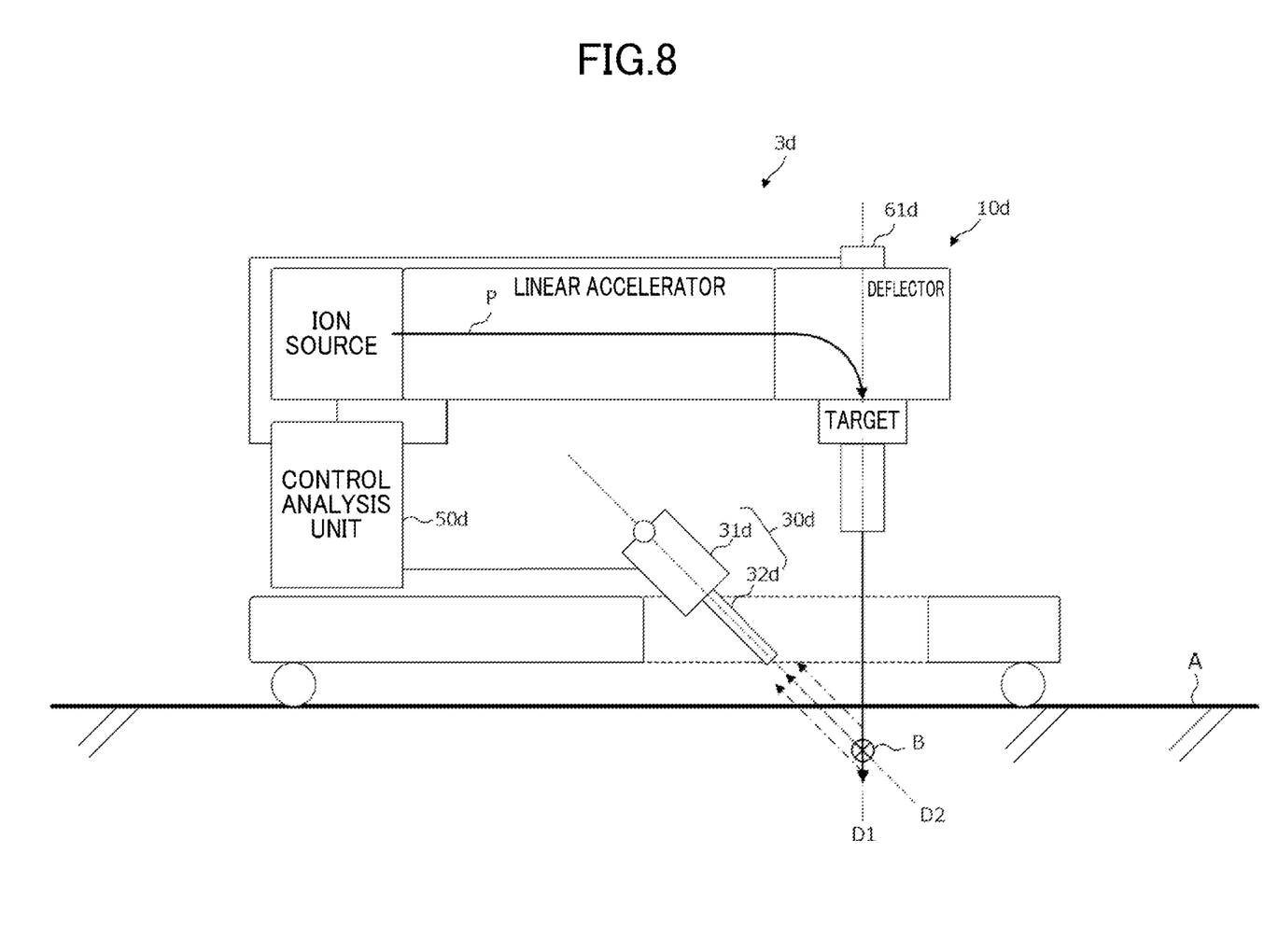
FIG. 8 is a schematic configuration diagram illustrating a salt measurement device of the third embodiment of the present disclosure.

FIG. 7 is a block diagram schematically showing a non-destructive inspection system of the third embodiment of the present disclosure. FIG. 8 is a schematic configuration diagram illustrating a salt measurement device of the third embodiment of the present disclosure. The configuration of a non-destructive inspection system 2' of the third embodiment will now be described with reference to these figures. The same reference characters are used to represent the same components as those in the second embodiment, and the descriptions thereof are omitted.

In the second embodiment, the salt concentration measurement device 3a of the nondestructive inspection system 2 uses the radioisotope 16a as a neutron source. The third embodiment is different in that a salt measurement device 3d of the non-destructive inspection system 2' uses an accelerator as a neutron source as in the first embodiment.

The salt measurement device 3d includes a neutron emission unit 10d, a gamma-ray detector 31d, a GNSS 61d, and a control analysis unit 50d. The control analysis unit 50d is communicatively connected to the neutron emission unit 10d, the gamma-ray detector 31d, and the GNSS 61d. The control analysis unit 50d is a dedicated computer, a general-purpose computer with software installed, or the like, and includes: an emission control unit 51d for controlling the neutron emission unit 10d; a dose information generation unit 52d and a salt concentration calculation unit 54d as analysis units for analysis; and a position information acquisition unit 57d that acquires the position of the inspection point B.

A specific configuration of the salt measurement device 3d is shown in FIG. 8. The salt measurement device 3d uses an accelerator as the neutron emission unit 10a as in the first embodiment. As is apparent from a comparison with FIG. 1 (the first embodiment), the salt measurement device 3d has a configuration of the non-destructive inspection apparatus 1 of the first embodiment without the thermal neutron detection unit 20 and the accompanying analysis unit (i.e., the water and cavity distribution generation unit 53, although not shown). The other configurations and functions are the same, and the detailed descriptions thereof will thus be omitted. The salt measurement device 3d with such a configuration causes the storage unit 73d to store the salt concentration at the inspection point B in association with the position information.

The water and cavity measurement device 3b and the correction processing unit 50c are the same as in the second embodiment, and the descriptions thereof will thus be omitted.

As described above, in the non-destructive inspection system 2' of the third embodiment, the devices for measuring the salt concentration and the water and cavity distribution are mounted on different moving objects. In both cases, an accelerator is used as a neutron source. This enables simple and efficient inspection based on the doses and emission times suitable for measuring the salt concentration and the water and cavity distribution.

The embodiments of the present disclosure have been described above. The present disclosure is however not limited to the embodiments described above.

While the bridge A has been described as an inspection object in the embodiments described above, the inspection object is not limited thereto. For example, applicable as the inspection object is a road, a wall of a building or a tunnel, a column, or any other concrete structure.

The gamma-ray detection unit in the above embodiments detects gamma rays to calculate the content of chlorine contained in an inspection object and generate a salt concentration distribution. The substance to be analyzed is however not limited to chlorine. For example, the substance may be iron or potassium with a relatively large cross-sectional area for capturing thermal neutrons.

Figure 9:
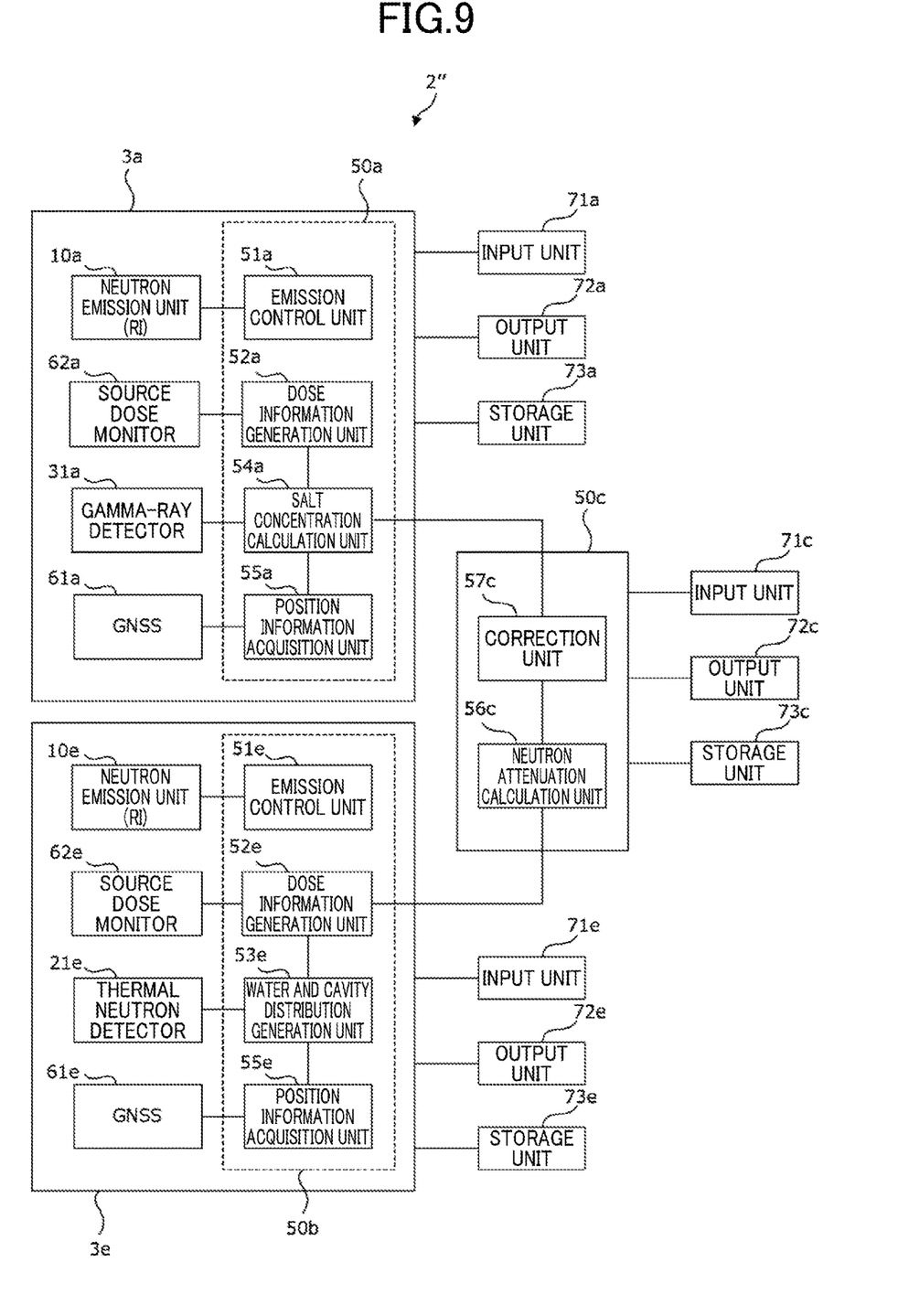
FIG. 9 is a block diagram schematically showing a non-destructive inspection system of a fourth embodiment of the present disclosure.

While the accelerator is used as a neutron source for the water and cavity measurement device 3b in the second embodiment, may be obtained using a radioisotope (RI) may be used as a neutron source as for the salt concentration measurement device 3a as shown in FIG. 9 (a fourth embodiment). The use of a radioisotope as a neutron source enables downsizing of both the salt concentration measurement device 3a and the water and cavity measurement device 3e, and thus allows inspection even in a place allowing no entry of large moving objects such as vehicles.

| DESCRIPTION OF REFERENCE CHARACTERS | |
|---|---|
| 1 | Non-Destructive Inspection Apparatus |
| 2, 2', 2" | Non-Destructive Inspection System |
| 3, 3a, 3d | Salt Concentration Measurement Device |
| 3b, 3e | Water and Cavity Measurement Device |
| 10, 10a, 10d | Neutron Emission Unit |
| 11 | Ion Source |
| 12 | Linear Accelerator |
| 13 | Deflector |
| 14 | Target |
| 15 | Emission Collimator |
| 16a | Radioisotope |
| 20 | Thermal Neutron Detection Unit |
| 21, 21a | Thermal Neutron Detector |
| 22 | Collimator |
| 30, 30a | Gamma-Ray Detection Unit |
| 31, 31a, 31b, 31d | Gamma-Ray Detector |
| 32 | Gamma-Ray Collimator |
| 33 | Movable Shaft |
| 40 | Moving Object |
| 41a | Wheel |
| 42, 42a | Opening |
| 50, 50a, 50d | Control Analysis Unit |
| 50c | Correction Processing Unit |

-continued

DESCRIPTION OF REFERENCE CHARACTERS

| | |
|---|---|
| 51, 51a, 51d | Emission Control Unit |
| 52, 52a, 52d | Dose Information Generation Unit |
| 53, 53a | Water and Cavity Distribution Generation Unit |
| 54, 54a, 54d | Salt Concentration Calculation Unit |
| 55, 55a, 55c | Neutron Attenuation Calculation Unit |
| 56, 56a, 56c | Correction Unit |
| 57, 57a, 57d | Position Information Acquisition Unit |
| 62a | Source Dose Monitor |
| 71, 71a, 71b, 71c | Input Unit |
| 72, 72a, 72b, 72c | Output Unit |
| 73, 73a, 73b, 73c, 73d | Storage Unit |
| 81a | Apparatus Case |
| 82a | Source Case |
| 83a | Emission Hole |
| 84a | Source Shutter |
| 86a | Outer Shutter |
| A | Bridge |
| B | Inspection Object |
| N | Neutron |
| Nb | Thermal Neutron |

The invention claimed is:

1. A non-destructive inspection system comprising:
a neutron emission unit capable of emitting neutrons having a first neutron dose;
a neutron detection unit capable of detecting a second neutron dose of neutrons scattered inside an inspection object by the emission of the neutrons from the neutron emission unit;
a gamma-ray detection unit capable of detecting a gamma dose of gamma rays released from the inspection object by the emission of the neutrons from the neutron emission unit; and
an analysis unit configured to calculate a content of a predetermined substance based on the gamma dose and correct the content of the predetermined substance based on the first neutron dose and the second neutron dose.

2. The non-destructive inspection system of claim 1, wherein
the content of the predetermined substance is a salt concentration.

3. The non-destructive inspection system of claim 1, wherein
the analysis unit generates a distribution of water and/or cavities contained in the inspection object based on the second neutron dose.

4. The non-destructive inspection system of claim 1, wherein
the neutron emission unit uses an accelerator, and
the non-destructive inspection system further comprises an emission control unit configured to cause the accelerator to emit neutrons having the first neutron dose.

5. The non-destructive inspection system of claim 1, wherein
the neutron emission unit uses a radioisotope, and
the non-destructive inspection system further comprises a dose monitor capable of detecting the first neutron dose.

6. The non-destructive inspection system of claim 1, wherein
the neutron emission unit is mounted on a moving object.

* * * * *